United States Patent [19]

Maraghe et al.

[11] Patent Number: 4,854,010

[45] Date of Patent: Aug. 8, 1989

[54] HINGE MEHANISM FOR AIRCRAFT DOOR

[75] Inventors: Alex Maraghe; Miloslav Puncoch, both of Seattle, Wash.

[73] Assignee: The Boeing Company, Seattle, Wash.

[21] Appl. No.: 123,599

[22] Filed: Nov. 20, 1987

[51] Int. Cl.[4] .............................................. E05D 15/30
[52] U.S. Cl. ........................................ 16/360; 49/248; 244/129.5; 244/137.1; 16/370; 16/368
[58] Field of Search ................. 16/357, 359, 360, 361, 16/348, 366, 370; 244/129.5, 137.1, 137.2; 49/248, 249, 252, 256

[56] References Cited

U.S. PATENT DOCUMENTS

| | | | |
|---|---|---|---|
| Re. 25,066 | 10/1961 | Heinemann et al. | 20/16 |
| 2,564,988 | 8/1951 | Muller | 20/16 |
| 2,751,636 | 6/1956 | Heinemann et al. | 20/16 |
| 2,763,900 | 9/1956 | McAfee et al. | 20/16 |
| 2,997,751 | 8/1961 | McPherren | 20/16 |
| 3,051,280 | 8/1962 | Bergman et al. | 189/46 |
| 3,085,297 | 4/1963 | Linderfelt | 20/16 |
| 3,791,073 | 2/1974 | Baker | 49/249 |
| 4,125,235 | 11/1978 | Fitzgerald et al. | 244/129.5 |
| 4,372,603 | 2/1983 | Stanczak et al. | 296/146 |
| 4,383,392 | 5/1983 | La Conte | 49/205 |
| 4,479,622 | 10/1984 | Howse | 244/129.5 |
| 4,712,828 | 12/1987 | Albrecht | 16/361 |
| 4,726,146 | 2/1988 | Opsahl | 16/348 |
| 4,738,003 | 4/1988 | Mori et al. | 16/370 |

FOREIGN PATENT DOCUMENTS

| | | | |
|---|---|---|---|
| 140724 | 4/1949 | Austria | 16/357 |
| 62570 | 3/1927 | Sweden | 16/360 |
| 524143 | 7/1940 | United Kingdom . | |

Primary Examiner—Nicholas P. Godici
Assistant Examiner—Edward A. Brown
Attorney, Agent, or Firm—Bruce A. Kaser

[57] ABSTRACT

A passenger door is connected to an aircraft fuselage by a hinge mechanism having an elongated goose-neck hinge member. One end of the hinge-member is pivotally connected to an idler crank arm that is pivotally connected to the fuselage. The other end of the goose-neck member is pivotally connected to the door. A guide arm connected to the door and carried by the idler crank arm controls door movement. An end of the guide arm has a pin that follows a groove in an "S"-shaped guide track. The shape of the track causes the guide arm to initally pivot and translate the door partially inwardly into the fuselage during opening movement, and then swing the door outwardly until it is parallel with the fuselage's outer surface.

4 Claims, 10 Drawing Sheets

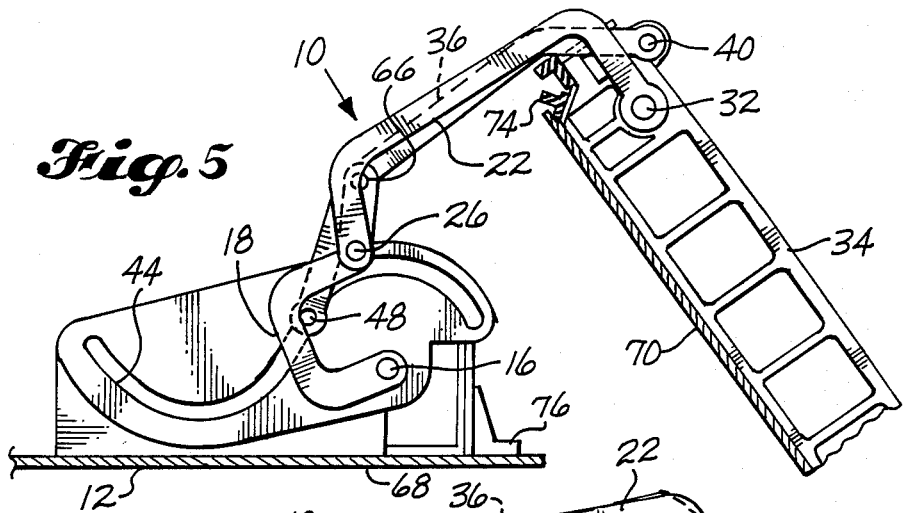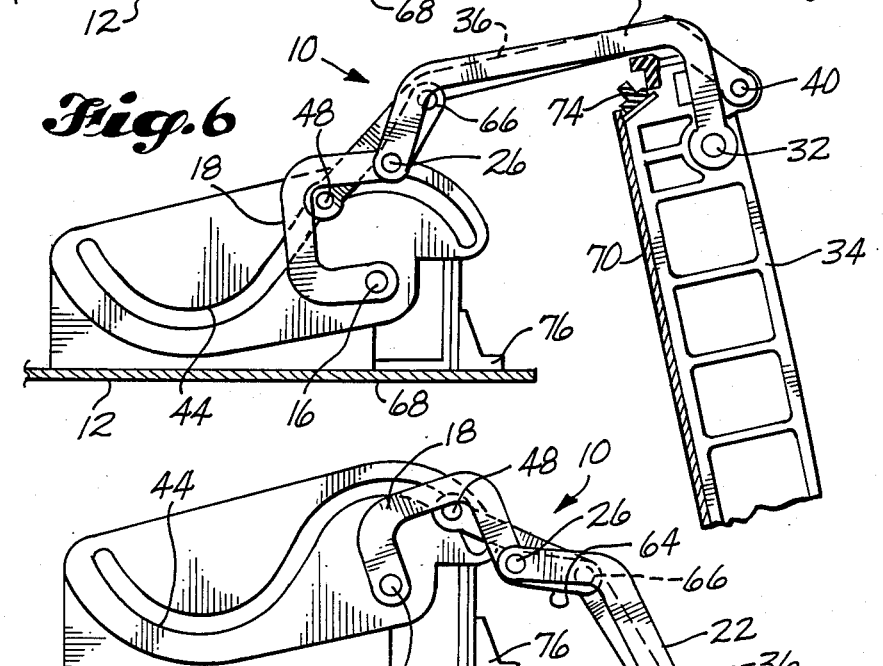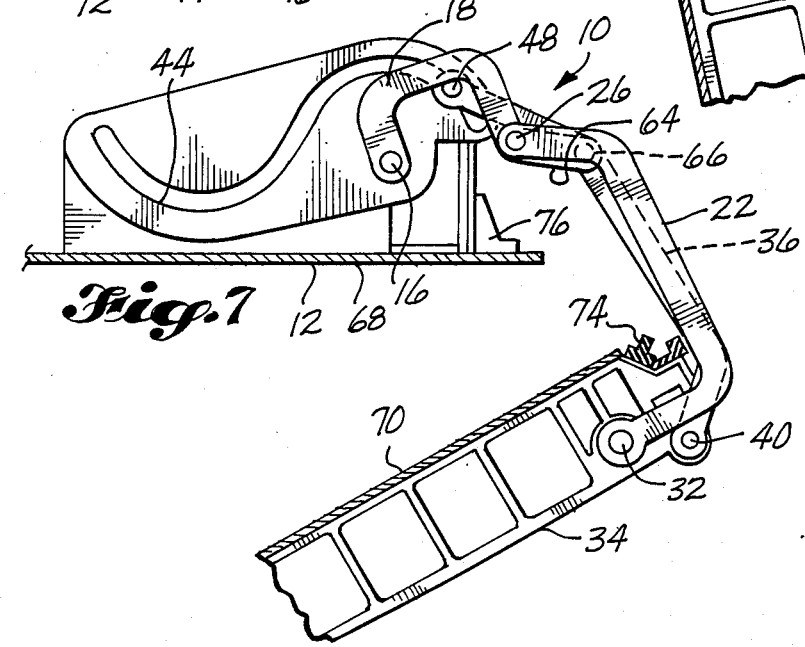

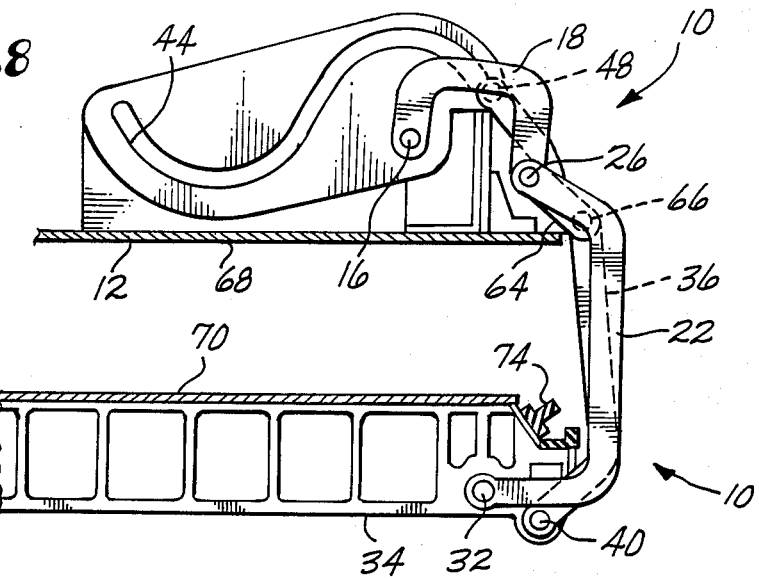
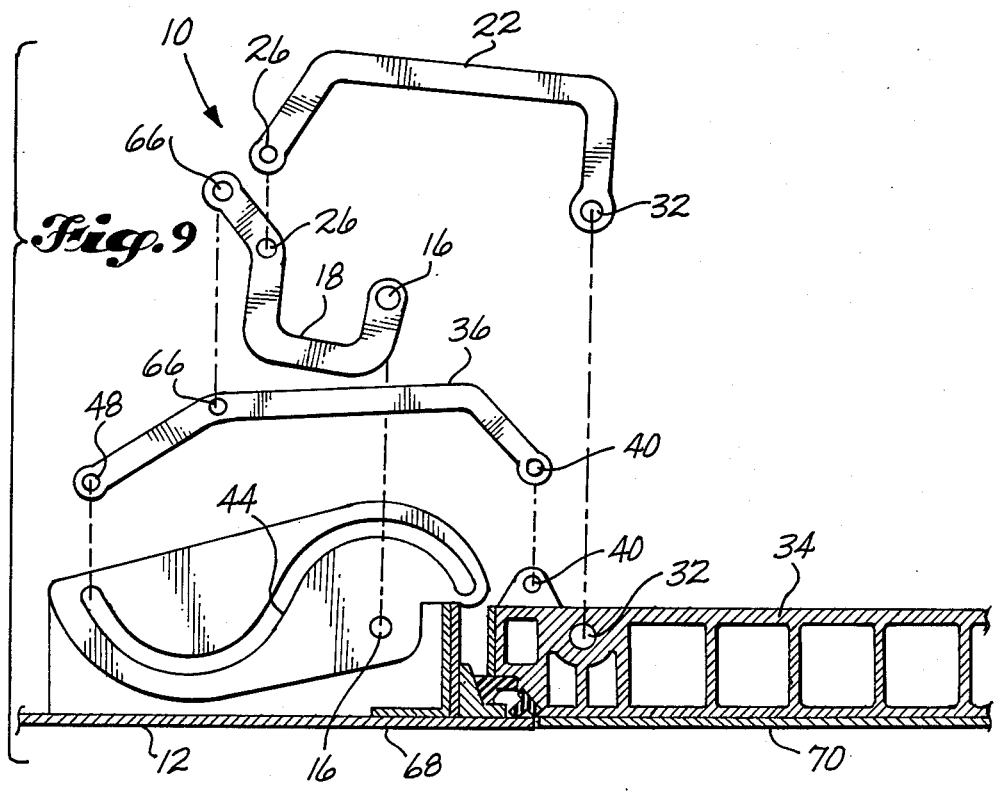

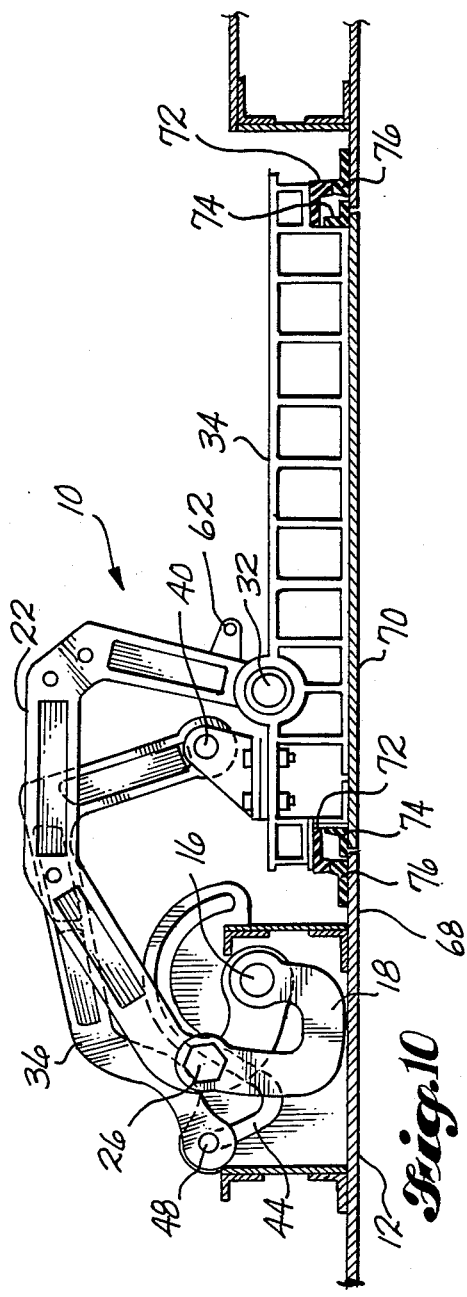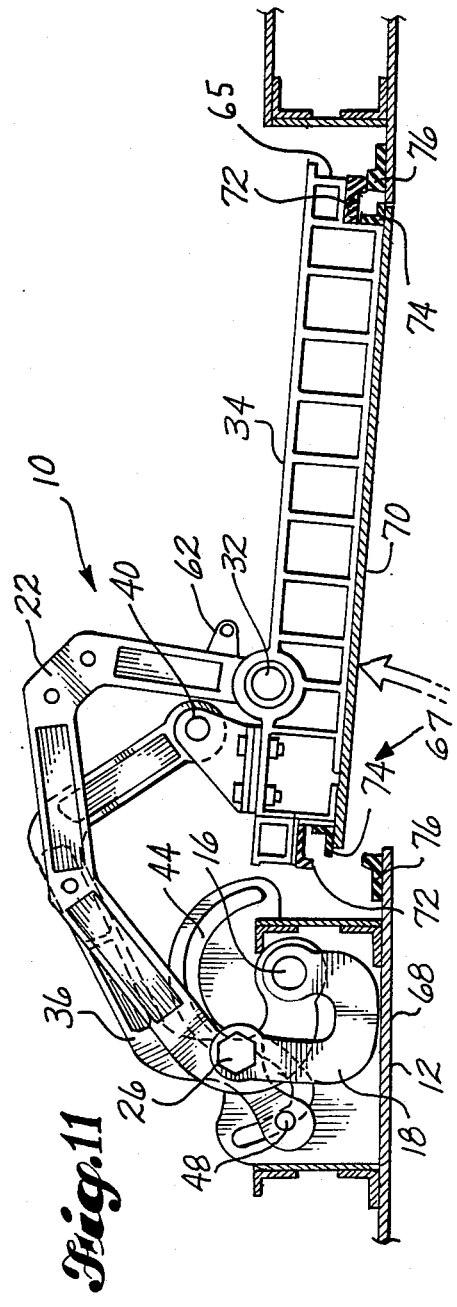

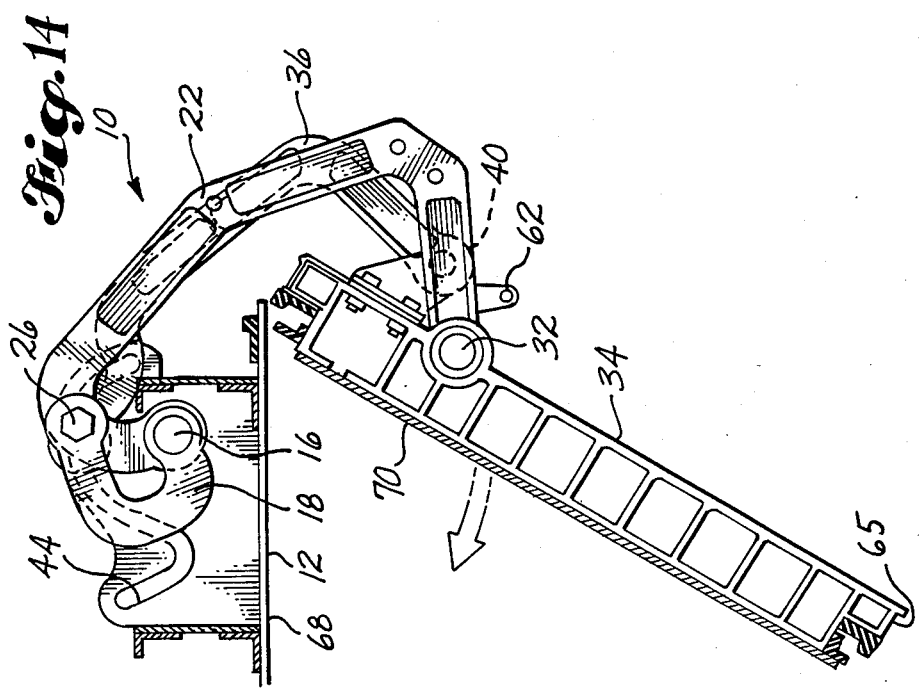

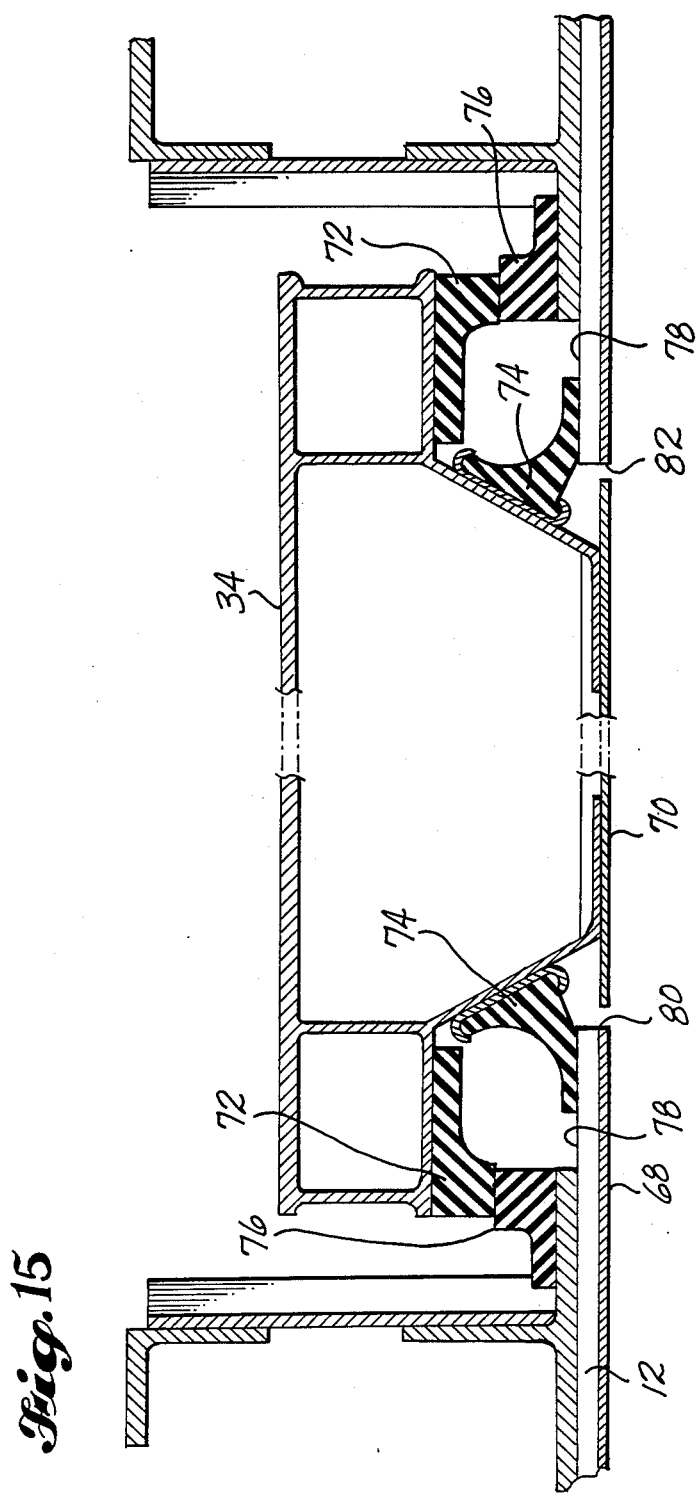

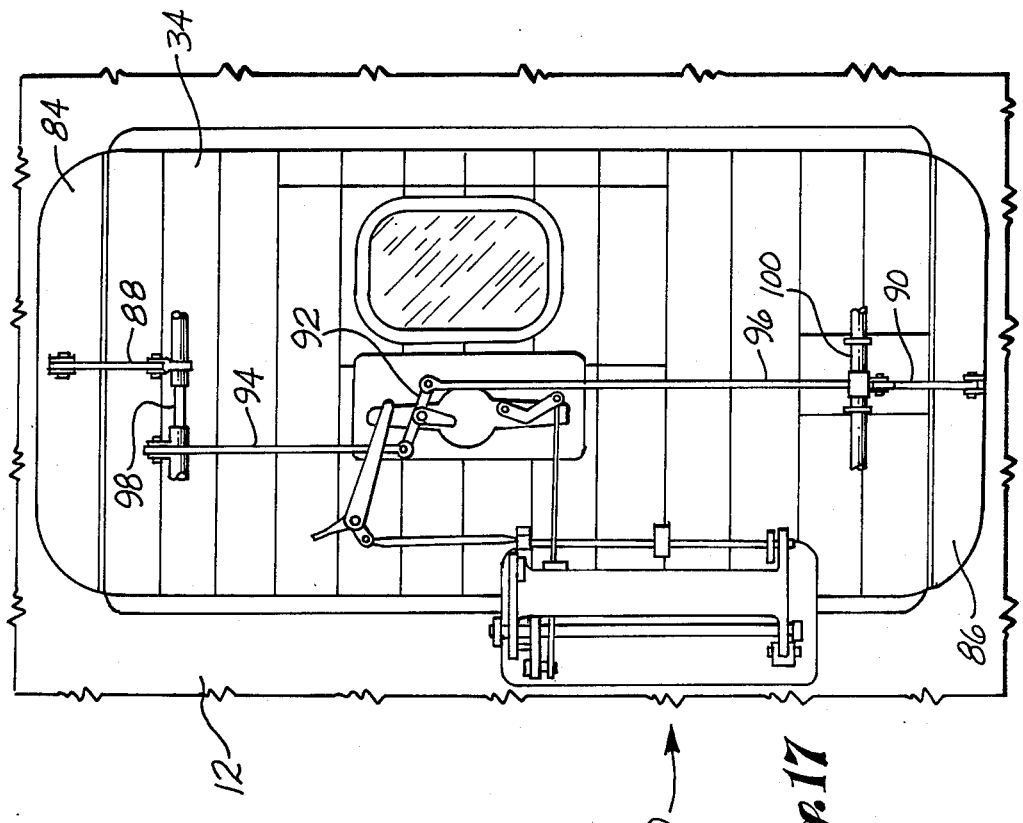
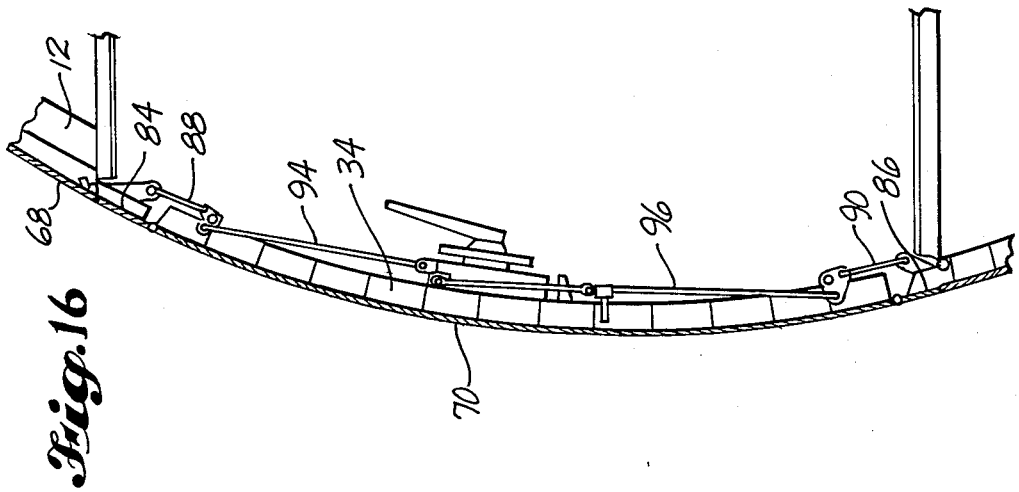

HINGE MEHANISM FOR AIRCRAFT DOOR

TECHNICAL FIELD

This invention relates to door hinges, and more particularly, to hinges for connecting a door to the fuselage of an aircraft.

BACKGROUND ART

In the past, many commercial passenger-carrying aircraft have utilized doors ranging in design from outwardly opening plug-type doors to inwardly opening overhead storage type doors. Virtually every known door design has had some kind of drawback. For example, some were difficult to either open or close. Others would stick. Still others had problems in providing a good seal around the door. On top of this, many designs have been difficult or expensive to install.

Although most past designs have been usable, they have not necessarily been the best. There has been a long-felt need to have an aircraft door that is improved both from an operational maintenance and cost standpoint. The present invention disclosed herein provides a means for improving on past designs, without sacrificing any functional or structural requirements.

DISCLOSURE OF THE INVENTION

In accordance with the invention a hinge mechanism is provided that is usable to mount an aircraft door to an entry way in a fuselage. The mechanism has a generally "U"-shaped idler crank arm, one end of the "U" being pivotally connected to fuselage wall structure. Pivotally connected to the other end of this arm is one end of a goose-neck shaped hinge member. The other end of the goose-neck member is pivotally connected to the door, and thereby acts or provides a means for mounting the door to the fuselage.

A guide arm member, for guiding the direction of door opening and closing movement, is pivotally carried by the idler crank arm. The guide arm may be pivotally connected to the crank arm on the same pivotal axis as the point at which the goose-neck member is connected thereto, or the guide arm may be pivotally connected at an off-set position. One end of this arm has a downwardly depending cam follower pin which is received in a horizontal "S"-shaped track. The track is also connected to the fuselage wall structure, and the cam follower pin follows its direction as the guide arm moves.

The other end of the guide arm is pivotally connected to the door, but at a position that is inward of or nearer the door's hinge-side edge than the position where the goose-neck member is connected to the door. Opening or closing movement of the door causes the guide arm to move. Meanwhile, the guide arm directs pivotal and translational movement of the door, which is dictated by the guide arm's cam follower pin following the track.

Although the goose-neck shaped hinge member as described above is pivotally connected to both the door and one end of the "U"-shaped idler crank arm, an acceptable alternative would be to connect the goose-neck member directly to the fuselage wall structure, instead of the crank arm. In this case, the goose-neck member would be preferably pivotally connected directly to the wall structure at the same axial position as the point where the crank arm is connected.

An advantage to a hinge mechanism constructed in accordance with the invention is that it renders an aircraft door easier to operate; less expensive to make or fabricate; and less costly to maintain. The mechanism eliminates hinge cut-outs from aircraft fuselage and door outer skins. This permits the use of a continuous stop on the door and body which simplifies door rigging and reduces structural weight, and further increases reliability in service. The hinge also provides a more efficient and noiseless door seal because the seal plane is simplified. The hinge pivot axis is also vertical and this reduces door opening and closing forces to a minimum, which eliminates counterbalance requirements for normal door operation. These advantages, and others, will become more apparent after considering the following description when taken in conjunction with the drawings.

BRIEF DESCRIPTION OF THE DRAWINGS

In the drawings, like parts are indicated by like reference numerals and letters throughout the various views, and wherein:

FIG. 5 is a view like FIGS. 2-5 and shows the door beginning to swing outwardly through an entryway in the fuselage;

FIG. 6 is a view like FIGS. 2-5 with the door moving still further outwardly;

FIG. 7 is a view like FIGS. 2-6;

FIG. 8 is a view like FIGS. 2-7 but shows the door fully open;

FIG. 9 is an exploded view of the hinge embodiment shown in FIGS. 2-8;

FIG. 10 is a view like FIG. 2, but shows still another embodiment of the invention;

FIG. 11 is a view like FIG. 3, but shows operation of the hinge embodiment shown in FIG. 10;

FIG. 14 is a view like FIG. 7 but for the embodiment shown in FIGS. 10-13;

FIG. 15 is an enlarged cross-sectional view of each side of the door shown in FIGS. 10-15, and shows peripheral strip-stop and sealing elements which extend around the door's edges and provide sealing contact between the door and fuselage;

FIG. 16 is a side cross-sectional view of an exemplary aircraft door mounted to a fuselage by a hinge in accordance with the invention; and FIG. 17 is a side pictorial view of the door shown in FIG. 16, looking from the inside of the aircraft, and shows how the hinge mechanism mounts the door.

BEST MODE FOR CARRYING OUT THE INVENTION

In the description which follows three embodiments of the invention will be presented. Each embodiment is mechanically equivalent and operates in the same way to mount an aircraft door to the side of a fuselage.

Figure 1:
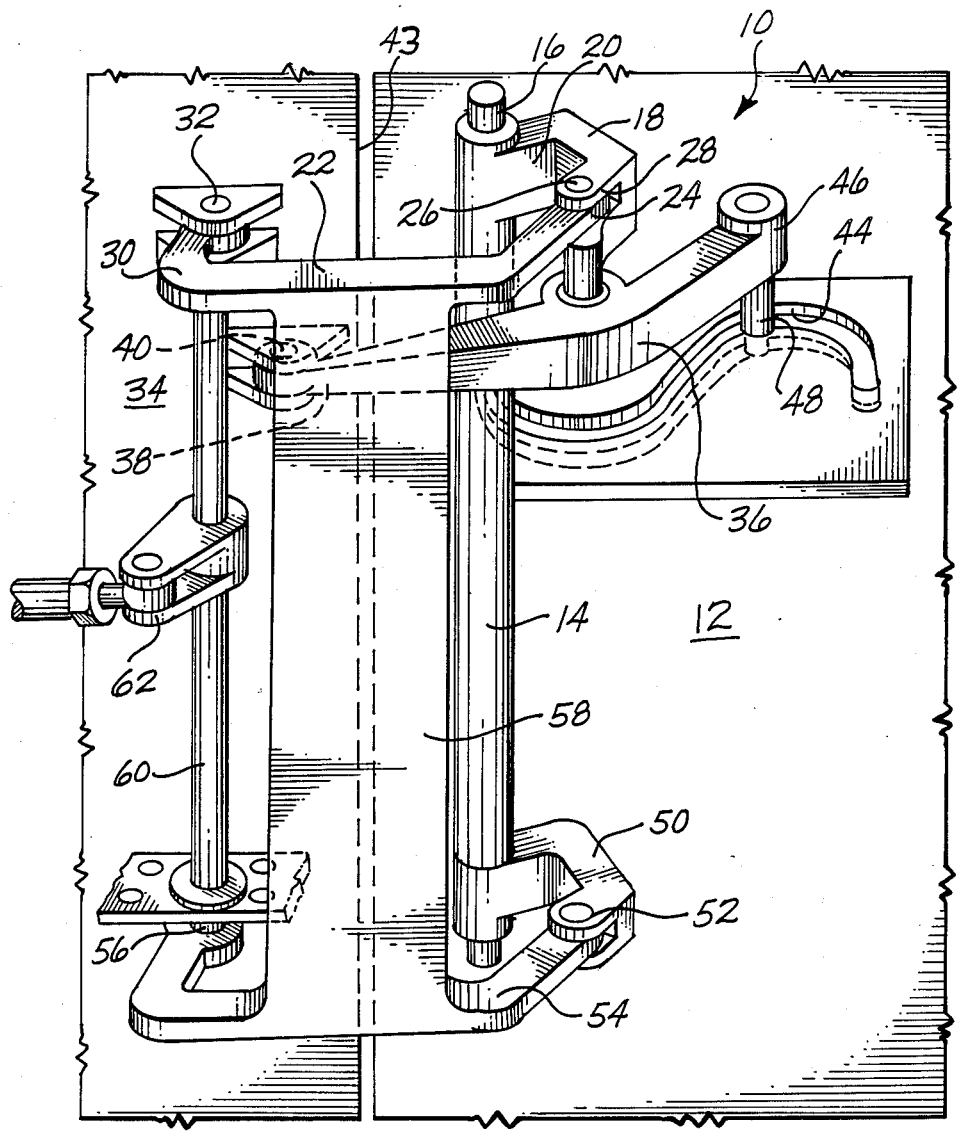
FIG. 1 is a fragmentary pictorial view of one embodiment of a hinge mechanism constructed in accordance with the invention, and shows an upper level hinge mounting the side or edge of a door to the side or edge of a fuselage wall.
Figure 2:
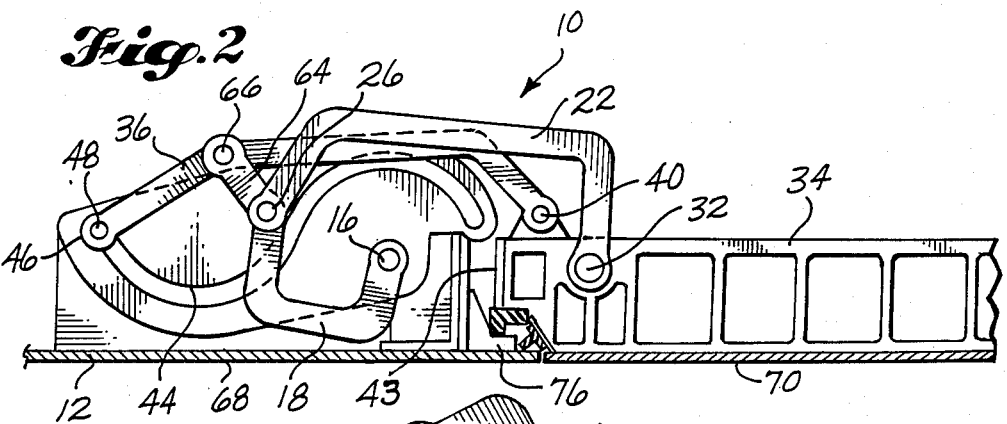
FIG. 2 is a top-plan view of a second embodiment of the invention, and shows a hinge in accordance with the invention mounting a door to a fuselage, but with the door in a closed position.

Referring first to FIG. 1, therein is shown generally at 10 a hinge mechanism constructed in accordance with one embodiment of the invention. The hinge mechanism is mounted to a fuselage wall 12 by a conventional torque tube fitting 14. This fitting 14 is pivotable about an axis defined by a pin 16 that is fixedly connected to the fuselage 12. An idler crank arm 18 has one end 20 directly connected to the torque tube fitting 14 so that this arm 18 can also pivot about the pin 16. A goose-neck shaped member 22 has a first end 24 pivotally connected at 26 to the other or second end 28 of the idler crank arm. The goose-neck member's second end 30 is pivotally connected at 32 to the aircraft door 34.

The invention further includes a guide arm 36 that is pivotally carried by the idler crank arm 18. In order words, the guide member 36 is pivotally connected to the crank arm 18 at 26, so that this arm may both pivot about 26 and translate as the idler crank arm 18 pivots about pin 16.

A first end 38 of the guide arm 36 is pivotally connected at 40 to the door 34. The location of this connection 40 is nearer the hinge-side edge 43 of the door 34 than is the position where the goose-neck member's second end 30 is connected to the door. An "S"-shaped track 44 is connected to the fuselage 12 in a substantially horizontal plane. The other or second end 46 of the guide arm 36 has a downwardly extending cam portion 48, or cam follower pin 48, that is received in the track 44. This pin 48 follows the direction or shape of the track during opening or closing movement of the door, which will be further described later.

As a person skilled in the art would realize, more than one hinge mechanism would be required to mount the door 34 to the fuselage 12. Therefore, in preferred form, a second idler crank arm 50 is shown pivotally connected to the bottom end of the torque tube fitting 14. This arm is similar to the idler crank arm 18 described above. It has one end connected at 52 to a lower goose-neck member 54. The goose-neck member 54 is pivotally connected at its other end 56 to the door 34. In the embodiment shown in FIG. 1, the upper and lower goose-neck members 22, 54 may be interconnected by a plate 58 so that they are structurally integrated together as a single piece. However, a person skilled in the art would realize that each goose-neck member 22, 54 may exist separately from the other. Further, it may be more practical to eliminate the plate 58 when taking into consideration such things as weight and cost in constructing the invention.

The pivot points 32, 56 at which both goose-neck members 22, 54 are connected to the door 34 may be fixedly interconnected by another torque tube 60. Rotating this tube 60 by a swing arm 62 places a clock-wise rotational opening force on the door. This further causes the guide arm 36 to first pivot and translate the door inwardly, and then swing it outwardly. A further discussion of this operation will follow below in conjunction with the description of the other embodiments of the invention.

Referring now to FIGS. 2–9, therein is shown a modified version of the hinge mechanism 10 shown in FIG. 1. In this version, the idler crank arm 18 has an additional arm section 64 that extends outwardly from the pivot point 26 where the goose-neck member 22 is connected to the crank arm. The guide arm 36 is pivotally carried by the crank arm 18 at the end 66 of the arm section 64.

Figure 3:
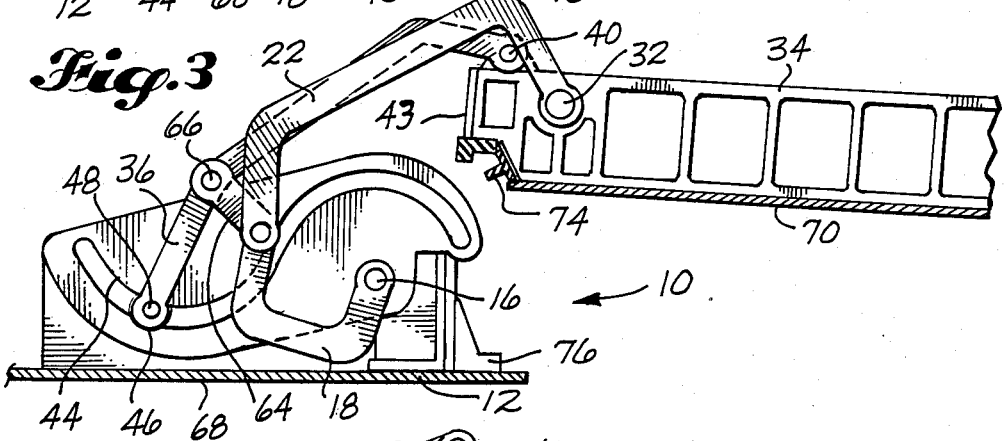
FIG. 3 is a view like FIG. 2, but shows operation of the hinge during initial opening movement of the door.
Figure 4:
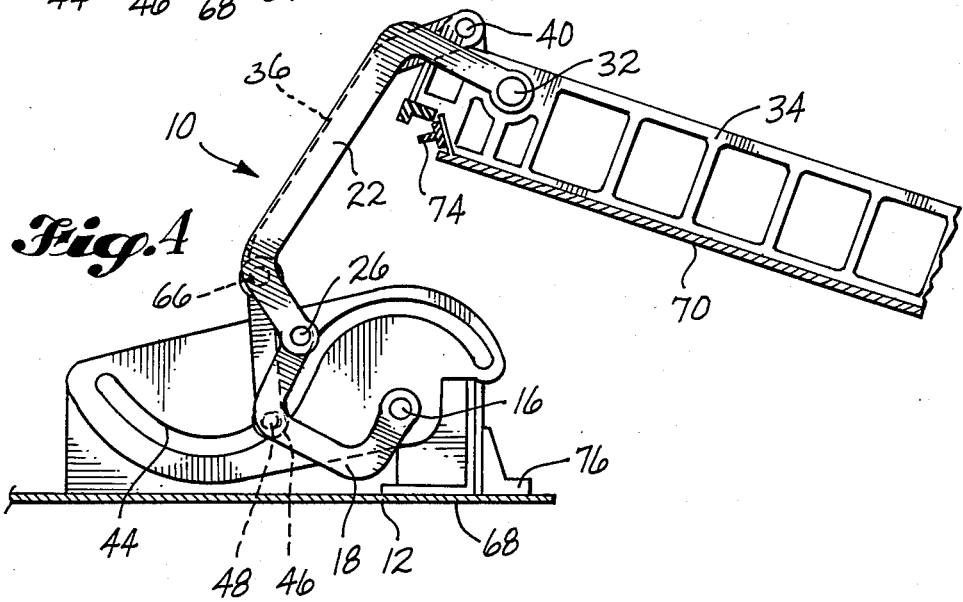
FIG. 4 is a view like FIGS. 2 and 3 and shows the door swinging further inwardly during the operation operation.
Figure 12:
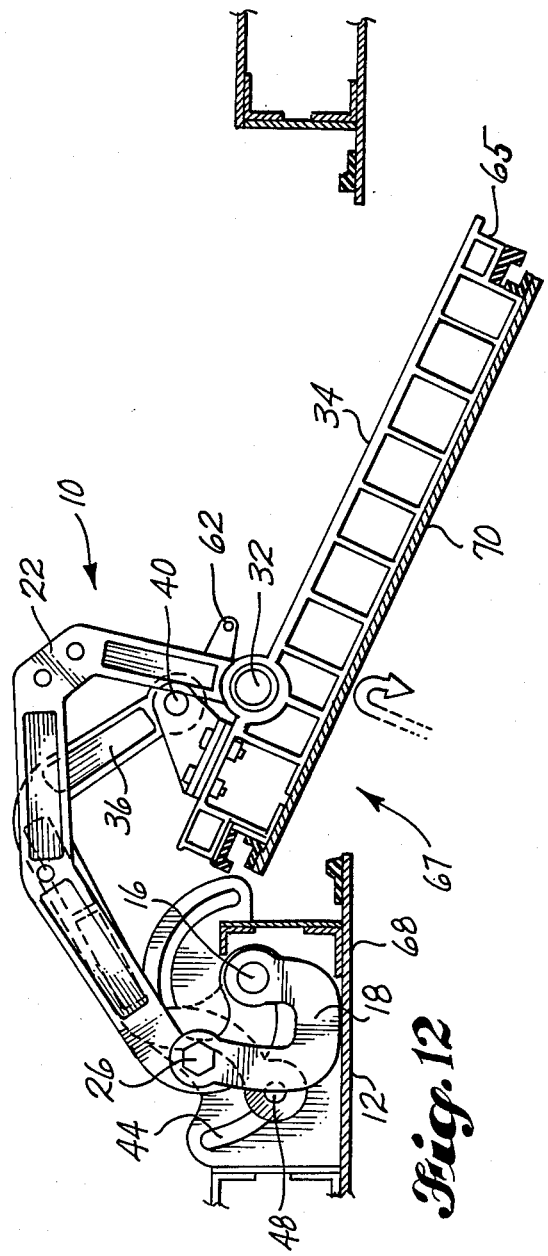
FIG. 12 is a view like FIG. 4, but for the embodiment shown in FIGS. 10 and 11.
Figure 13:
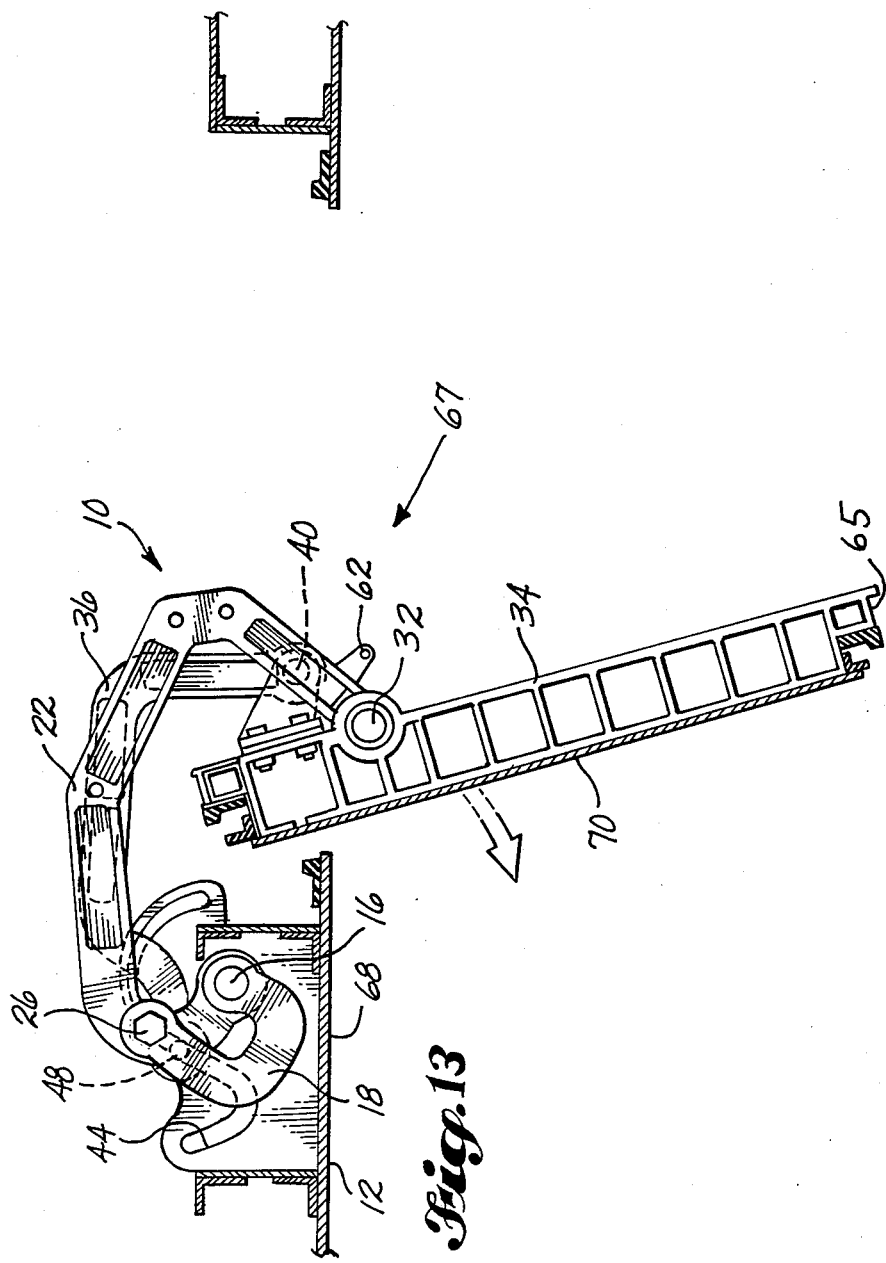
FIG. 13 is a view like FIGS. 5 and 6 but shows the hinge embodiment of FIGS. 10-12.

FIGS. 2–8 illustrate how the hinge mechanism 10 operates when the door 34 is opened. Generally, a door handle or swing arm, like swing arm 62 in FIG. 1, is used to place a clock-wise opening force on the door 34. The opening force causes the door's hinge-side edge 43 to first pull inwardly and laterally as shown in FIGS. 3 and 4. Simultaneously, the cam-follower end 46 of the guide arm begins to follow the direction of the "S"-shaped track, which initiates clock-wise door turning movement about pivotal point 32. This causes the door's hinge-side edge 43 to turn as the door 34 is further brought inside the fuselage. The hinge-side edge 43 is brought inwardly a sufficient distance until the other side of the door can be swung outwardly through the fuselage's door entryway 67.

In FIGS. 10–14, still another embodiment of the invention is shown. In these Figs., the configuration of the guide arm 36, track 44, goose-neck member 22 and idler crank arm 18 have all been altered somewhat, but their function and operation remain the same. The guide arm 36 in this embodiment is pivotally carried by the U-shaped idler crank arm 18 at pivot point 26, which is the same as the embodiment in FIG. 1. However, instead of being connected to the same point 26, the goose-neck member 22 is pivotally connected to the torque tube at 16. Therefore, in this embodiment the goose-neck member 22 is a single piece that structurally interconnects the door 34 and fuselage 12.

As mentioned previously, a hinge mechanism constructed in accordance with the invention provides many advantages. To being with, the hinge 10 requires no slots or other discontinuities in either the outside 68 of the fuselage 12 or the outside 70 of the door 34. This reduces aircraft skin drag in the area of the door.

Another advantage is that the hinge 10 permits a very good seal between the door and fuselage. Referring to FIG. 15, for example, therein is shown resilient sealing elements 74 which surround the outer periphery of the door 34. Attached to the inside of the fuselage and around the door's entryway is a strip-stop element 76. When the door 34 is closed, another strip-stop element 72, connected to the door 34, contacts strip-stop element 76. At the same time, sealing element 74 contacts the inside skin surface 78 of the fuselage, near the entryway's edges 80, 82.

The above-described advantages lead to still another advantage in that they permit the door 34 to be made of light-weight materials. Referring to FIGS. 16 and 17, therein is shown a door 34 that is suitable for use in connection with the invention. This door 34 is slightly larger than the entryway through the fuselage 12. It has upper and lower door flaps 84, 86 which are normally unfolded as shown n FIG. 17 when the door is fully closed, but which are pulled down or folded by push-/pull rods 88, 90 prior to opening or closing movement. A rotatable crank arm 92 simultaneously operates both rods 88, 90 by means of vertical rods 94, 96. These rods 94, 96 are connected to the push/pull rods 88, 90 by upper and lower rotatable torque tubes 98, 100.

Prior to opening the door 34, crank arm 92 is rotated, which pulls or folds the flaps 84, 86 downwardly and inwardly. Then, the door 34 is opened in the manner shown in FIGS. 2–8, and the door is swung out through the fuselage. Since the door 34 is larger than fuselage entryway 67, this permits internal cabin air pressure to force the outer edge of the door outwardly against the inside edges 78 of the entryway. This enhances the contact between the previously described strip-stop elements 74, 76, as well as the sealing element 72.

It should be appreciated that the hinge mechanism 10 could be mounted to either side of the door. For example, in FIG. 18 the hinge 10 is shown mounted to the left-hand side of the door, rather than the right-hand side as shown in FIG. 1.

Having thus described the above embodiments of the invention, it should be appreciated that further changes could be made to the invention without departing from the spirit and scope thereof. Any patent protection due to the applicant should not be limited by the above description or the accompanying drawings. Rather, the applicant's patent rights are to be limited only by the patent claim or claims which follow. Such claims are to be interpreted in accordance with the legally established doctrines of patent claim interpretation.

What is claimed is:

1. A hinge mechanism for mounting a door to an entryway in a wall, comprising:
    an idler crank arm having first and second ends, said first end being pivotally connected to said wall;
    a goose-neck member having first and second ends, wherein said first end of said member is pivotally connected to said idler crank arm's second end, and wherein said second end of said member is pivotally connected to said door near a side edge of said door;
    a guide arm having first and second ends, wherein one of said guide arm ends is pivotally connected to said door at a position nearer the side edge of said door than the position where said second end of said goose-neck member is pivotally connected to said door, in a manner so that said guide arm moves in response to opening and closing movement of said door, said guide arm being supportably connected to said idler crank arm in a manner so that said guide arm may both pivot and translate as said guide arm moves;
    an "S"-shaped track connected to said wall; and
    cam follower means for causing the other end of said guide arm to follow the direction of said track's shape as said guide arm moves.

2. The hinge mechanism of claim 1, wherein said cam follower means includes a cam follower pin connected to said other end of said guide arm, said pin depending downwardly therefrom, and said pin being received in said "S"-shaped track.

3. The hinge mechanism of claim 1, wherein said guide arm is pivotally connected to said idler crank arm on substantially the same pivotal axis as the location at which said goose-neck member is connected to said idler crank arm.

4. The hinge mechanism of claim 1, wherein said idler crank arm includes a "U"-shaped portion, one end of said portion being pivotally connected to said wall and the other end of said portion being pivotally connected to said first end of said goose-neck member, said "U"-shaped portion further having an arm section extending away from said second end thereof, and wherein said guide arm is pivotally connected to the end of said arm section.

* * * * *